(12) United States Patent
Wang et al.

(10) Patent No.: US 7,518,338 B2
(45) Date of Patent: Apr. 14, 2009

(54) PARALLEL HYBRID BATTERY PACK CHARGING

(75) Inventors: Ligong Wang, Round Rock, TX (US); Stephen D. Sterz, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 362 days.

(21) Appl. No.: 11/403,264

(22) Filed: Apr. 13, 2006

(65) Prior Publication Data
US 2007/0247107 A1  Oct. 25, 2007

(51) Int. Cl.
*H01M 10/46* (2006.01)
(52) U.S. Cl. .................. 320/125; 320/126
(58) Field of Classification Search .......... 320/107, 320/116, 117, 126, 127, 128, 134, 160, 125
See application file for complete search history.

(56) References Cited

U.S. PATENT DOCUMENTS

| 4,609,860 | A | * | 9/1986 | Fasen | 320/131 |
| 5,998,968 | A | * | 12/1999 | Pittman et al. | 320/130 |
| 6,198,250 | B1 | | 3/2001 | Gartstein et al. | |
| 6,835,491 | B2 | | 12/2004 | Gartstein et al. | |
| 2004/0135548 | A1 | * | 7/2004 | Takano et al. | 320/132 |
| 2005/0001593 | A1 | | 1/2005 | Kawasumi et al. | |

* cited by examiner

*Primary Examiner*—Edward Tso
(74) *Attorney, Agent, or Firm*—Haynes and Boone, LLP

(57) ABSTRACT

For charging a rechargeable hybrid battery pack, a first cell stack coupled in parallel with a second cell stack of the hybrid battery pack are pre-charged in parallel. The cell stack to first complete the pre-charge phase, is selected to receive a normal charge with a constant current while the non-selected one of the cell stack continues to receive the pre-charge. The first cell stack and the second cell stack receive the normal charge in the selected sequence. Upon completion of the normal charge for each cell of the hybrid battery pack, the first cell stack and the second cell stack are trickle-charged in parallel to complete the charging.

18 Claims, 5 Drawing Sheets

PARALLEL HYBRID BATTERY PACK CHARGING

BACKGROUND

The present disclosure relates to the field of rechargeable batteries, and more particularly to improving charge time for the rechargeable batteries included in an information handling system.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, entertainment, and/or global communications. In addition, IHSs may include a variety of hardware and software components that may be configured to process, store, and communicate information and may include one or more computer systems, data storage systems, and networking systems.

A battery converts chemical energy within its material constituents into electrical energy in the process of discharging. A rechargeable battery (may be simply referred to as a battery) is generally returned to its original charged state (or substantially close to it) by a charger circuit, which passes an electrical current in the opposite direction to that of the discharge. Presently, well known rechargeable battery technologies include Lithium Ion (LiON), Nickel Cadmium (NiCd), and Nickel Metal Hydride (NiMH).

The combination of smaller form factors, higher system power and the demand for longer run times in a portable IHS has driven rechargeable batteries toward increasingly complex shapes and sizes. In some applications, mechanical constraints may drive a need for packaging of two different cell types (e.g., prismatic shaped cell and cylindrical shaped cell) in one battery, commonly known as a hybrid battery pack. The hybrid battery pack is divided into at least two stacks separated by the cell type. In a standard battery pack all battery cells are substantially identical and charging and discharging techniques developed for the standard battery pack may not be applicable to the hybrid battery pack. The standard battery pack as well as the hybrid battery pack is typically equipped with electronic circuitry to monitor and control its operation.

However, traditional techniques for charging the hybrid battery pack often result in a higher charge time. Therefore, a need exists for an improved method and system to charge a hybrid battery pack. Accordingly, it would be desirable to provide for a more efficient hybrid battery pack included in an IHS, absent the disadvantages discussed above.

SUMMARY

The foregoing need is addressed by the teachings of the present disclosure, which relates to charging a hybrid battery pack. According to one embodiment, for charging a rechargeable hybrid battery pack, a first cell stack coupled in parallel with a second cell stack of the hybrid battery pack are pre-charged in parallel. The cell stack to first complete the pre-charge phase, is selected to receive a normal charge with a constant current while the non-selected one of the cell stack continues to receive the pre-charge. The first cell stack and the second cell stack receive the normal charge in the selected sequence. Upon completion of the normal charge for each cell of the hybrid battery pack, the first cell stack and the second cell stack are trickle-charged in parallel to complete the charging.

Several advantages are achieved according to the illustrative embodiments presented herein. The embodiments advantageously provide a reduction in total charge time for charging a hybrid battery pack. By performing some of the charging operations such as pre-charging and/or trickle-charging in parallel, the time to charge the at least two different cell stacks of the hybrid battery pack is reduced. Thus, the improved method and system increases user experience without incurring substantial additional costs.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices, boards, cards, modules, blocks, and/or components described herein may be implemented as hardware (including discrete components, integrated circuits and systems-on-a-chip 'SOC'), firmware (including application specific integrated circuits and programmable chips) and/or software or a combination thereof, depending on the application requirements.

As described earlier, traditional techniques for charging hybrid battery packs often result in a higher charge time. The higher charge time is often due to the execution of charge sequences one at a time. According to one embodiment, for charging a rechargeable hybrid battery pack, a first cell stack coupled in parallel with a second cell stack of the hybrid battery pack are pre-charged in parallel. The cell stack to first complete the pre-charge phase, is selected to receive a normal charge with a constant current while the non-selected one of the cell stack continues to receive the pre-charge. The first cell stack and the second cell stack receive the normal charge in the selected sequence. Upon completion of the normal charge for each cell of the hybrid battery pack, the first cell stack and the second cell stack are trickle-charged in parallel to complete the charging.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price. The IHS may include random access memory (RAM), one or more processing resources such as central processing unit (CPU) or hardware or software control logic, read only memory (ROM), and/or other types of nonvolatile memory. Additional components of the HIS may include one or more disk drives, one or more network ports for communicating with external devices as well as various I/O devices, such as a keyboard, a mouse, and a video display. The IHS may also include one or more buses operable to receive/transmit communications between the various hardware components.

Figure 1:
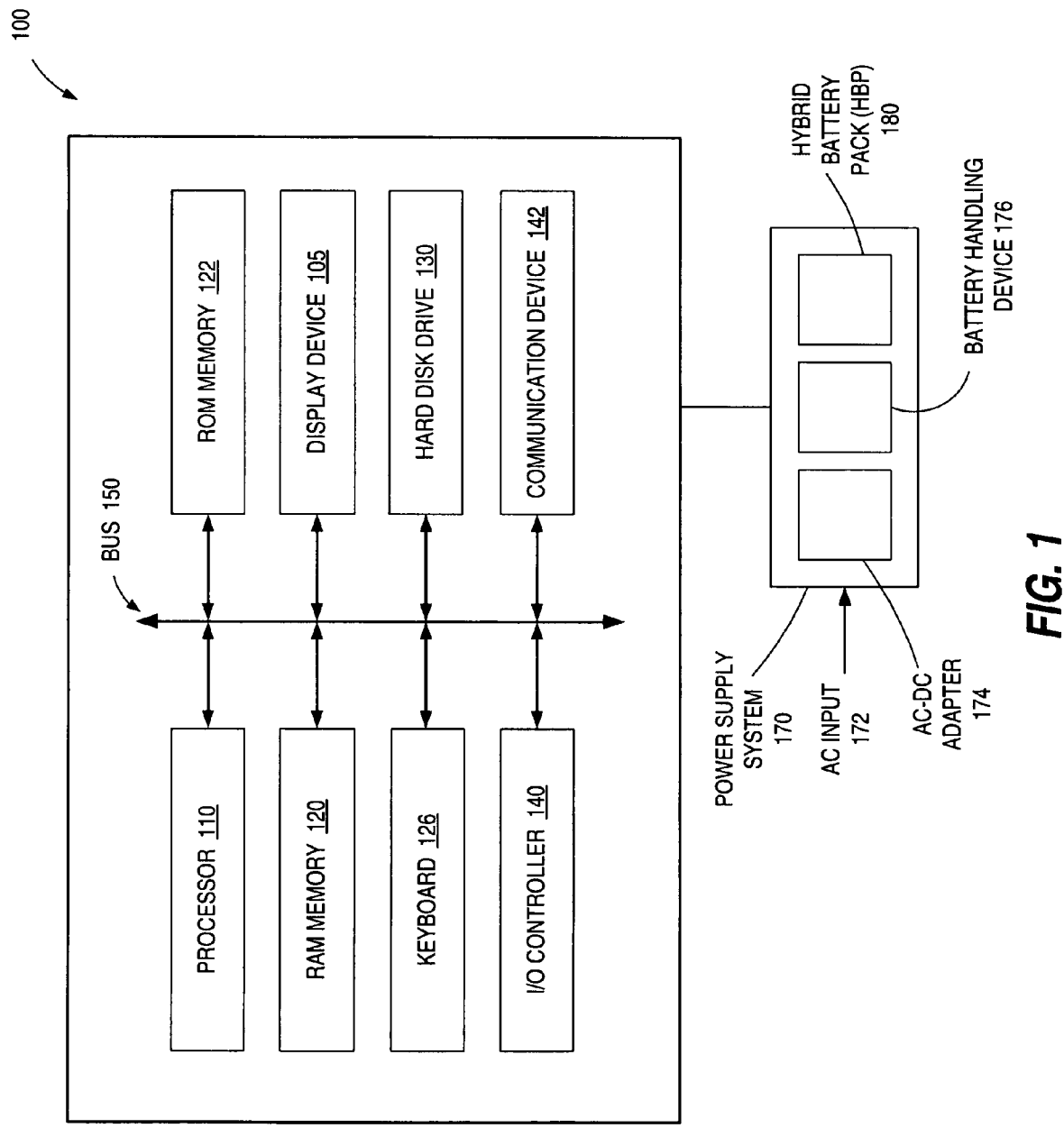
FIG. 1 illustrates a block diagram of an IHS having an improved power supply, according to an embodiment.

FIG. 1 illustrates a block diagram of an IHS 100 having an improved power supply, according to an embodiment. The IHS 100 includes a processor 110, a system RAM 120 (also referred to as main memory), a non-volatile ROM 122 memory, a display device 105, a keyboard 126 and an I/O controller 140 for controlling various other I/O devices. For example, the I/O controller 140 may include a keyboard controller, a cursor device controller and/or the serial I/O controller. It should be understood that the term "information handling system" is intended to encompass any device having a processor that executes instructions from a memory medium.

The IHS 100 is shown to include a hard disk drive 130 connected to the processor 110, although some embodiments may not include the hard disk drive 130. In a particular embodiment, the IHS 100 may include additional hard disks. The processor 110 communicates with the system components via a bus 150, which includes data, address and control lines. In an exemplary, non-depicted embodiment, not all devices shown may be directly coupled to the bus 150. In one embodiment, the IHS 100 may include multiple instances of the bus 150. The multiple instances of the bus 150 may be in compliance with one or more proprietary standards and/or one or more industry standards such as peripheral component interconnect (PCI), PCI express (PCIe), industry standard architecture (ISA), universal serial bus (USB), system management bus (SMBus), and similar others. A communications device 142, such as a network interface card and/or a radio device, may be connected to the bus 150 to enable wired and/or wireless information exchange between the IHS 100 and other devices (not shown).

In a particular embodiment, the IHS 100 receives power from a power supply system 170, which includes an alternating current (AC) to direct current (DC) adapter 174, a battery handling device 176, and a rechargeable hybrid battery pack 180 (which may be simply referred to as the HBP 180). The power supply system 170 receives an AC input 172 such as 120/240 volts from an electrical wall outlet. The power supply system 170 includes the AC-DC adapter 174 for converting the AC input 172 to a DC output. The battery handling device 176 receives the DC output from the AC-DC adapter 174 to provide power to a load and/or to the HBP 180. Thus, the battery handling device 176, which may include a battery charger/battery discharge circuit, fulfills the dual functions of supplying DC power to various components of the IHS and providing a charge to the HBP 180. When operating in a battery powered mode, the HBP 180 provides the power to the load. The load may include one or more components of the IHS 100 such as the processor 110. The battery handling device 176 and the HBP 180 may communicate with one or more components of the IHS 100 via the SMbus (not shown). Additional detail of the technique for charging the HBP 180 is described with reference to FIGS. 2A and 2B.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. An operating system (OS) (not shown) of the IHS 100 is a type of software program that controls execution of other software programs, referred to as application software programs. In various embodiments the instructions and/or software programs may be implemented in various ways, including procedure-based techniques, component-based techniques, and/or object-oriented techniques, among others. Specific examples include assembler, C, XML, C++ objects, Java and Microsoft's .NET technology.

Figure 2A:
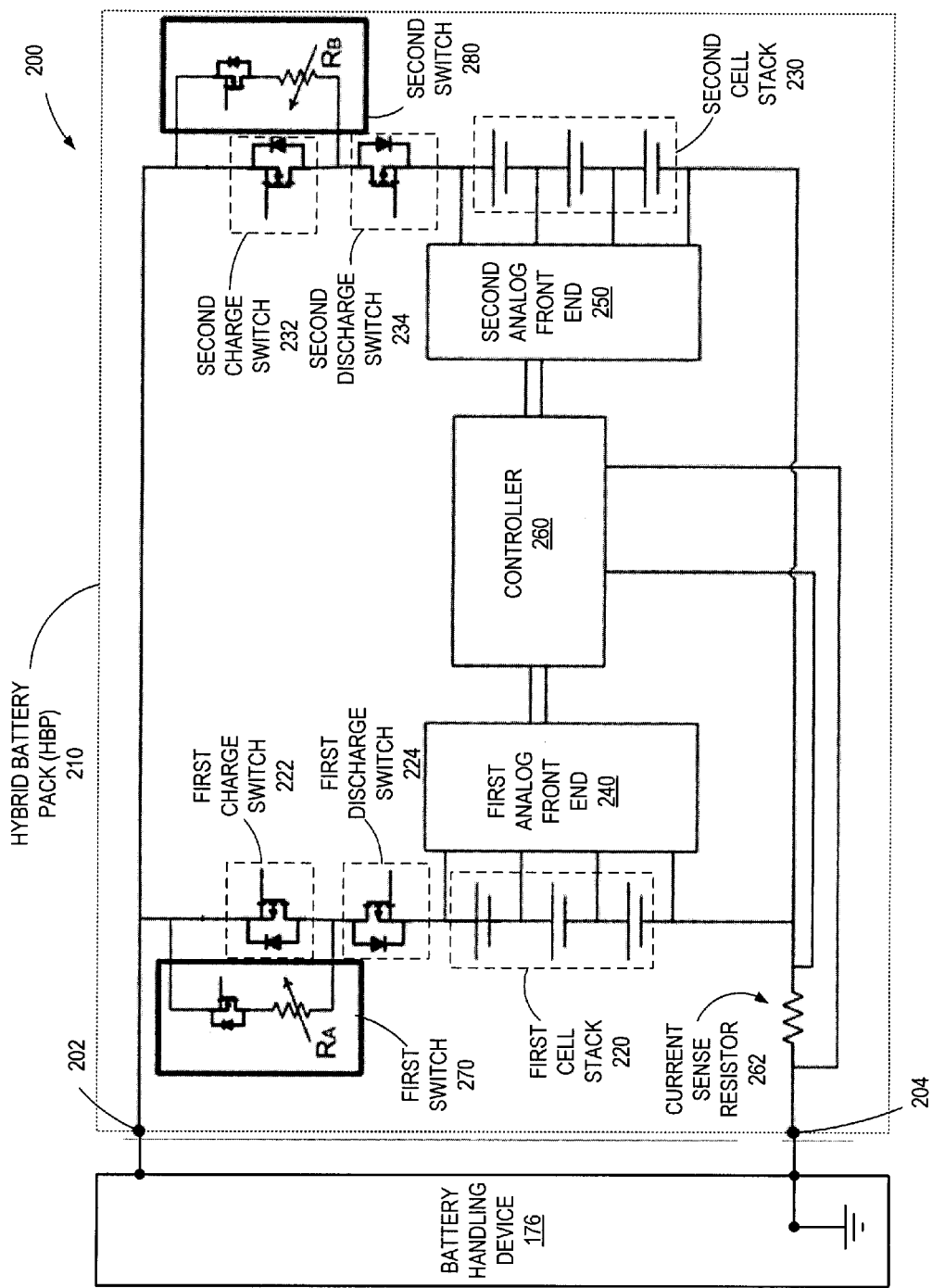
FIG. 2A illustrates a block diagram of a system for charging a hybrid battery pack described with reference to FIG. 1, according to an embodiment.

FIG. 2A illustrates a block diagram of a system 200 for charging a HBP 210 coupled to the battery handling device 176 described with reference to FIG. 1, according to an embodiment. In one embodiment, the HBP 210 is substantially the same as the HBP 180 described with reference to FIG. 1.

The HBP 210 is electrically coupled to the battery handling device 176 via a positive terminal 202 and a negative terminal 204 for receiving and/or sending the charge. In one embodiment, the negative terminal 204 may be coupled to a ground reference. Although not shown, the HBP 210 and the battery handling device 176 may also be coupled via additional control lines and/or bus communications. The battery handling device 176 is configured to provide a DC voltage output at the positive terminal 202 that is nominally set to approximately 12.6V, which is sufficiently high to charge the HBP 210 to a fully charged state. However, a particular value for the DC voltage output configured for various IHS devices such as PDA's and cellular phones may be different.

In the depicted embodiment, the HBP 210 includes a first cell stack 220 coupled in parallel with a second cell stack 230. That is, separate parallel electrical paths are provided from the positive terminal 202 to the first cell stack 220 and to the second cell stack 230 before returning to the negative terminal 204. Coupled in series with the first cell stack 220 are a first charge switch 222 and a first discharge switch 224. Coupled in series with the second cell stack 230 are a second charge switch 232 and a second discharge switch 234. A first analog front end (AFE) 240 measures a voltage across the first cell stack 220. Similarly, a second analog front end (AFE) 250 measures a voltage across the second cell stack 230.

A controller 260 controls the operation of the HBP 210. A battery management unit (BMU) may be configured to include the controller 260, the first AFE 240 and the second AFE 250. In an embodiment, the controller 260 controls the operation of the first charge switch 222, the first discharge switch 224, the second charge switch 232 and the second discharge switch 234 to control the charging and discharging phases. The controller 260 controls the operating condition of the HBP 210, in co-ordination with a controller of the IHS 100 (such as the I/O controller 140). More specifically, the controller 260 monitors battery related parameters such as the energy or charge level, voltage level and the current flowing through the first cell stack 220 and the second cell stack 230. In one embodiment, the HBP 210 has a stack voltage of approximately (12V-16.8V) and (9V-12.6V) depending on the type of battery. The trend is towards the development of newer batteries having a stack voltage such as approximately between 6V and 17.4V.

In the depicted embodiment, a current sense resistor 262 is included to measure current flowing through the HBP 210. In an exemplary, non-depicted embodiment, a current sense resistor may be included in each of the parallel paths to measure current flowing through the first cell stack 220 and through the second cell stack 230.

In the depicted embodiment, a first switch 270 is coupled in parallel with the first charge switch 222 and a second switch 280 is coupled in parallel with the second charge switch 232. In an embodiment, the operation of the first switch 270 is complementary to the first charge switch 222 and the operation of the second switch 280 is complementary to the second charge switch 232. That is, when the first charge switch 222 is disabled (no current is flowing) the first switch 270 may be enabled (current is flowing) and when the second charge switch 232 is disabled (no current is flowing) the second switch 280 may be enabled (current is flowing). The first switch 270 and the second switch 280 are controlled by the controller 260 to provide a charge path from the positive terminal 202 to the first cell stack 220 and the second cell stack 230 respectively. Specifically, the first switch 270 and the second switch 280 may be concurrently enabled thereby providing the charge to the first cell stack 220 and the second cell stack 230 in parallel. In an embodiment, the first switch 270 may include a first variable resistor 272 and the second switch 280 may include a second variable resistor 282 to limit the current.

Figure 2B:
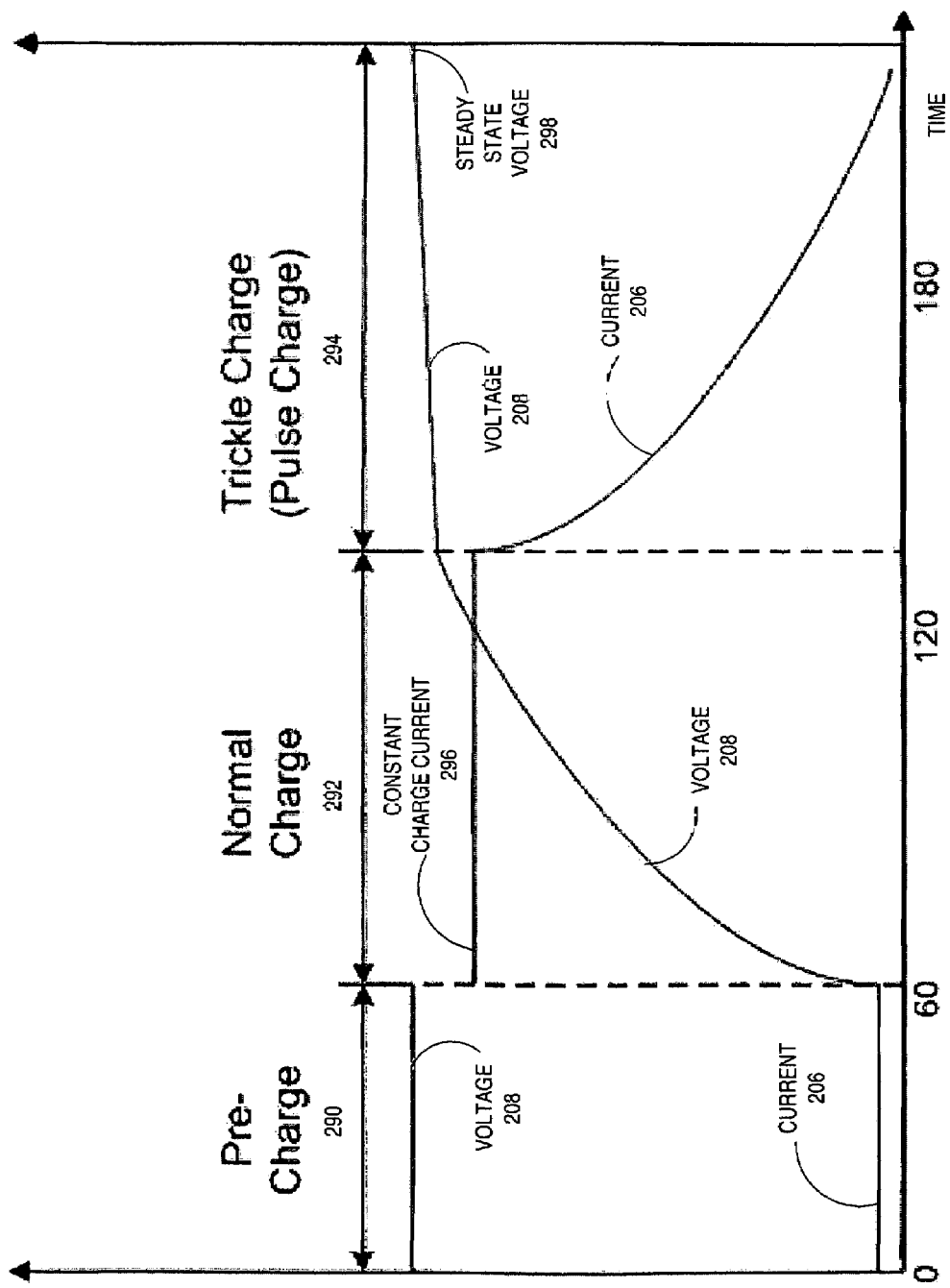
FIG. 2B illustrates current and voltage waveforms during charging of a cell stack, according to an embodiment.

FIG. 2B illustrates current 206 and voltage 208 waveforms during charging of a cell stack, according to an embodiment. Referring now to FIGS. 2A and 2B, when a charge level stored in either one or both the first cell stack 220 and the second cell stack 230 falls below a threshold, the controller 260 requests the controller to initiate a pre-charging of the cell stacks. The charging occurs in three sequential phases, which include a pre-charging phase 290, a normal charging phase 292 (may also be simply referred to as charging) and a trickle-charging phase 294 (may also be referred to as pulse-charging). An amount of current flowing through the HBP 210 during the normal charge phase 292 is substantially higher compared to the amount of current flowing during the pre-charge phase 290 and/or during the trickle-charge phase 294. For example, the current flowing during the pre-charge phase and/or during the trickle-charge phase may be measured in milli amperes (mA), whereas a constant charge current 296 provided to the cell stacks during the normal charge phase may exceed one ampere.

The primary purpose of the pre-charge phase 290 is to increase the stack voltage for the first cell stack 220 and the second cell stack 230 above a threshold voltage, thereby enabling the cell stacks to be rapidly charged during the normal charge phase 292. The majority of the charge replenishment in the cell stacks occurs during the normal charge phase 292. However, as the charge stored in the cell stacks approaches a certain fill level and as the voltage at the cell stacks approaches a steady state voltage 298, the rapid charge is discontinued and is replaced by a trickle charge. In the trickle-charge phase 294, the charge is added as a decaying current in a constant voltage mode to charge the cell stacks from the certain fill level to the fully charged level.

The controller 260 is operable to select parallel charging during the pre-charging phase 290 and the trickle-charging phase 294 and select sequential charging during the normal charge phase 292. Additional details of the parallel and sequential charging technique is described with reference to FIG. 3.

In an embodiment, each one of the switches may be implemented using a MOSFET body diode. The MOSFET body diode is advantageously used to minimize the impact of an accidental reverse connection of the HPB 210 and/or other over-current causing conditions.

Figure 3:
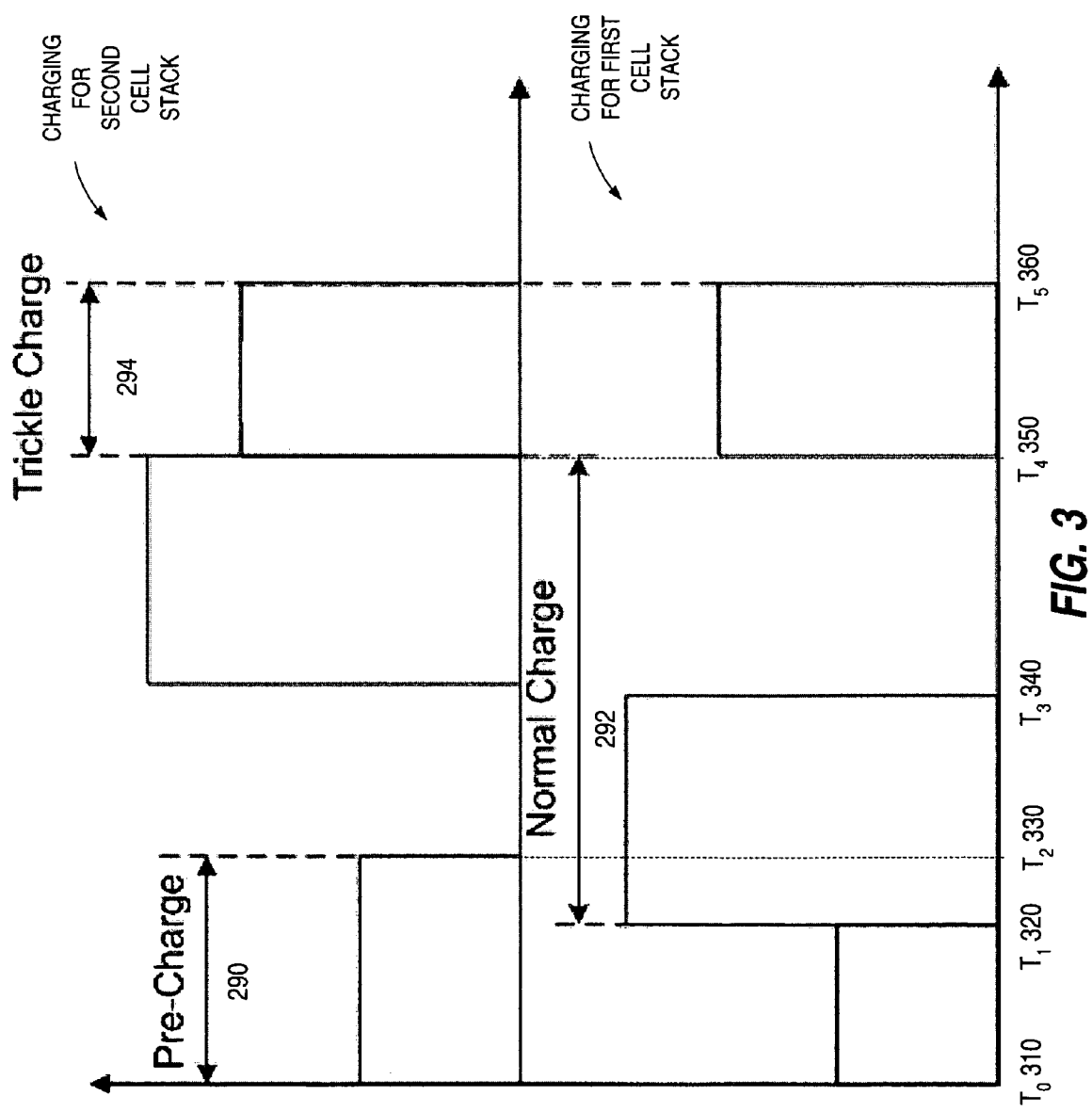
FIG. 3 illustrates a timing diagram for charging cell stacks of a hybrid battery pack described with reference to FIGS. 2A and 2B, according to an embodiment.

FIG. 3 illustrates a timing diagram for charging cell stacks of a hybrid battery pack described with reference to FIGS. 2A and 2B, according to an embodiment. At time $T_0$ 310, the controller 260 enables the first switch 270 and the second switch 280 to initiate the pre-charging phase 292. Thus, the charge received at the positive terminal 202 is provided in parallel to the first cell stack 220 and the second cell stack 230. At time $T_1$ 320, the pre-charging phase 290 for the first cell stack 220 is complete, e.g., as measured by stack and/or cell voltage. In response to the completion of the pre-charging phase 290, the controller 260 enables the first charge switch 222 thereby enabling the first cell stack 220 to enter normal charge phase 292 and receive charge as the constant charge current 296. The second cell stack 230 continues to operate in the pre-charge phase 290 while the first cell stack 220 is operating in parallel in the normal charge phase 292. At time $T_2$ 330, the second cell stack 230 completes the pre-charge phase 290. At time $T_3$ 340, the first cell stack 220 completes the normal phase 292. In response to the completion, the controller 260 initiates, in sequence, the normal charge phase 292 for the second cell stack 230. At time $T_4$ 350, the second cell stack 230 completes the normal phase 292. In response to the second cell stack 230 completing the normal charge phase 292, the controller 260 enables the first switch 270 and the second switch 280 to initiate the trickle-charging phase 294 to provide the charge to the first cell stack 220 and the second cell stack 230 in parallel. At time $T_5$ 360, the first cell stack 220 and the second cell stack 230 complete the trickle-charge phase 294 and the HBP 210 is fully charged. The parallel charging during the pre-charging phase 290 and during the trickle-charging phase 294 advantageously reduces the total charge time and enhances user experience.

Figure 4:
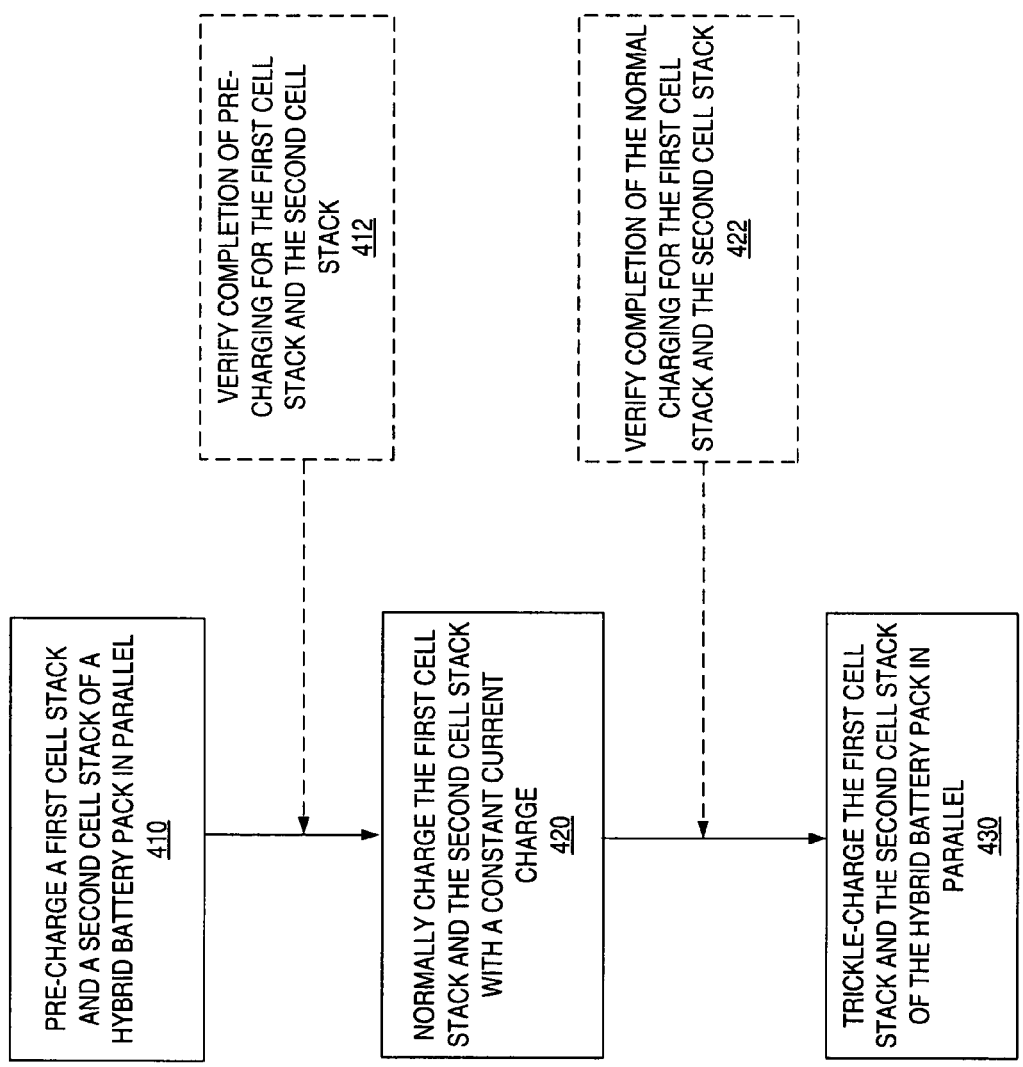
FIG. 4 is a flow chart illustrating a method for charging a rechargeable hybrid battery pack, according to an embodiment.

FIG. 4 is a flow chart illustrating a method for charging a rechargeable HBP, according to an embodiment. In a particular embodiment, the rechargeable HBP is the rechargeable HBP 210 described with reference to FIGS. 2A, 2B and 3. In step 410, a first cell stack and a second cell stack of the HBP 210 are pre-charged in parallel. In step 420, the first cell stack and the second cell stack are normally charged with a constant current charge. The constant current charge is provided in sequence to one of the first cell stack and the second cell stack. In step 430, the first cell stack and the second cell stack of the HBP 210 are trickled-charged in parallel.

Various steps described above may be added, omitted, combined, altered, or performed in different orders. In a particular embodiment, an additional step 412 may be added to verify completion of the pre-charging for the first cell stack and the second cell stack before proceeding to step 420. As another example, an additional step 422 may be added to verify completion of the normal charging for the first cell stack and the second cell stack before proceeding to step 430.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A charge circuit for a hybrid battery pack, the charge circuit comprising:
   a first switch operable to provide a charge to a first cell stack of the hybrid battery pack;
   a first charge switch coupled in parallel with the first switch;

a second switch operable to provide the charge to a second cell stack of the hybrid battery pack, wherein the first cell stack and the second cell stack are coupled in parallel;

a second charge switch coupled in parallel with the second switch; and a controller to control each one of the first switch and the second switch in accordance with a parallel charging sequence for the first cell stack and the second cell stack, wherein the parallel charging sequence includes providing the charge to the first cell and to the second cell in parallel during a pre-charge phase and during a trickle-charge phase.

2. The charge circuit of claim 1, wherein the charge received in parallel by the first cell stack and the second cell stack during the pre-charge phase increases a voltage of each one of the first cell stack and the second cell stack above a threshold voltage.

3. The charge circuit of claim 2, wherein the charge received in parallel by the first cell stack and the second cell stack during the trickle-charge phase increases the voltage above the threshold voltage to a fully charged voltage.

4. The charge circuit of claim 1, comprising:

the controller operable to control the first charge switch the second charge switch, wherein the first charge switch and the second charge switch are operable to provide the charge to the first cell stack and the second cell stack respectively in accordance with a serial charging sequence during a normal charge phase, wherein the charge provided during the serial charging sequence is greater compared to the parallel charging sequence.

5. The charge circuit of claim 4, wherein operation of the first switch and the first charge switch is complementary, wherein operation of the second switch and the second charge switch is complementary.

6. The charge circuit of claim 1, wherein the first switch includes a variable first resistor coupled in series, wherein the variable first resistor controls an amount of the charge flowing through the first switch.

7. The charge circuit of claim 1, wherein the second switch includes a variable second resistor coupled in series, wherein the variable second resistor controls an amount of the charge flowing through the second switch.

8. A method for charging a rechargeable hybrid battery pack, the method comprising:

pre-charging a first cell stack and a second cell stack, wherein the pre-charging of the first cell stack and the second cell stack occurs in parallel, wherein the hybrid battery pack includes the first cell stack and the second cell stack;

charging the first cell stack and the second cell stack, wherein the charging occurs with a constant current charge provided in sequence to one of the first cell stack and the second cell stack; and trickle-charging the first cell stack and the second cell stack, wherein the trickle-charging of the first cell stack and the second cell stack occurs in parallel.

9. The method of claim 8, wherein the first cell stack includes a first cell type and the second cell stack includes a second cell type, wherein the first cell type and the second cell type are different.

10. The method of claim 9, wherein the first cell type is of a prism shape and the second cell type is of a cylindrical shape.

11. The method of claim 8, wherein one of the first cell stack and the second cell stack is pre-charging while another one of the first cell stack and the second cell stack is charging with the constant current charge.

12. The method of claim 8, wherein the charging occurs in response to a completion of the pre-charging, wherein the trickle-charging occurs in response to a completion of the charging.

13. The method of claim 8, wherein an amount of the constant current charge provided to the first cell stack and the second cell stack is substantially greater in comparison to a charge provided during the pre-charging phase and the trickle-charging phase.

14. The method of claim 8, wherein the sequence includes providing the constant current charge to a first one of the first cell stack and the second cell stack that has completed the pre-charging.

15. An information handling system (IHS) comprising:

a processor;

a hybrid rechargeable battery operable to provide power to the processor, wherein the hybrid rechargeable battery includes:

a first cell stack operable to store the power; and a second cell stack coupled in parallel to the first cell stack, wherein the second stack is operable to store the power;

a first switch operable to provide a charge to the first cell stack;

a first charge switch coupled in parallel with the first switch;

a second switch operable to provide the charge to the second cell stack;

a second charge switch coupled in parallel with the second switch; and a controller to control each one of the first switch and the second switch in accordance with a parallel charging sequence for the first cell stack and the second cell stack, wherein the parallel charging sequence includes providing the charge to the first cell and to the second cell in parallel during a pre-charge phase and during a trickle-charge phase.

16. The system of claim 15, comprising:

the controller operable to control the first charge switch and the second charge switch, wherein the first charge switch and the second charge switch are operable to provide the charge to the first cell stack and the second cell stack respectively in accordance with a serial charging sequence during a normal charge phase, wherein the charge provided during the serial charging sequence is greater compared to the parallel charging sequence.

17. The system of claim 16, wherein operation of the first switch and the first charge switch is complementary, wherein operation of the second switch and the second charge switch is complementary.

18. The system of claim 15, wherein each one of the first switch and the second switch includes a variable resistor coupled in series, wherein the variable resistor controls an amount of the charge correspondingly flowing through the first switch and the second switch.

* * * * *

UNITED STATES PATENT AND TRADEMARK OFFICE
CERTIFICATE OF CORRECTION

| | | |
|---|---|---|
| PATENT NO. | : 7,518,338 B2 | Page 1 of 1 |
| APPLICATION NO. | : 11/403264 | |
| DATED | : April 14, 2009 | |
| INVENTOR(S) | : Wang et al. | |

It is certified that error appears in the above-identified patent and that said Letters Patent is hereby corrected as shown below:

Claim 4; Column 7; Line 25; after the word switch insert --and--.

Signed and Sealed this

Sixth Day of October, 2009

David J. Kappos
*Director of the United States Patent and Trademark Office*